United States Patent
Jamal-Syed et al.

(10) Patent No.: US 9,832,517 B2
(45) Date of Patent: Nov. 28, 2017

(54) SEAMLESS PLAYBACK OF MEDIA CONTENT USING DIGITAL WATERMARKING

(71) Applicant: TELEFONAKTIEBOLAGET L M ERICSSON (PUBL), Stockholm (SE)

(72) Inventors: Shaheer Jamal-Syed, Shanghai (CN); Andreas Ljunggren, Vällingby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/905,182

(22) PCT Filed: Jul. 17, 2013

(86) PCT No.: PCT/CN2013/079501
§ 371 (c)(1),
(2) Date: Jan. 14, 2016

(87) PCT Pub. No.: WO2015/006933
PCT Pub. Date: Jan. 22, 2015

(65) Prior Publication Data
US 2016/0165297 A1    Jun. 9, 2016

(51) Int. Cl.
*H04N 21/43* (2011.01)
*H04N 21/8358* (2011.01)
(Continued)

(52) U.S. Cl.
CPC ... *H04N 21/4307* (2013.01); *H04N 21/42203* (2013.01); *H04N 21/4302* (2013.01);
(Continued)

(58) Field of Classification Search
CPC ........ H04N 21/4307; H04N 21/42203; H04N 21/4302; H04N 21/43615; H04N 21/4394;
(Continued)

(56) References Cited

U.S. PATENT DOCUMENTS

| 7,873,974 B2 | 1/2011 | DaCosta |
| 8,531,603 B2 | 9/2013 | Strein et al. |

(Continued)

FOREIGN PATENT DOCUMENTS

| CN | 101595492 A | 12/2009 |
| CN | 102572445 A | 7/2012 |
| CN | 102959544 A | 3/2013 |

OTHER PUBLICATIONS

International Search Report and Written Opinion dated Apr. 30, 2014, in International Application No. PCT/CN2013/079501, 16 pages.

(Continued)

*Primary Examiner* — Mishawn Hunter
(74) *Attorney, Agent, or Firm* — Rothwell, Figg, Ernst & Manbeck, P.C.

(57) ABSTRACT

Methods and apparatus are described that provide a mechanism for transferring and/or synchronizing playback of media content from one media device to another in a seamless fashion. A media device 102 may be arranged to detect playback of media content from another media device 104. The media device 102 captures a portion of the media content being played back and identifies the captured media content and content provider 106*a*. The media device downloads or streams the identified media content from the content provider 106*a*, while also synchronizing playback of the identified/downloaded/streamed media content on the media device 102 with the playback of the media content on the other device 104. The media content may be embedded with a digital watermark for identification of the media content and the content provider 106*a*. A machine-to-machine platform 108 may assist in identifying the media content and content provider 106*a* from the captured media content.

20 Claims, 8 Drawing Sheets

(51) Int. Cl.
  *H04N 21/422* (2011.01)
  *H04N 21/436* (2011.01)
  *H04N 21/439* (2011.01)
  *H04N 21/658* (2011.01)
  *H04N 21/81* (2011.01)
  *H04N 21/8352* (2011.01)
  *H04N 21/44* (2011.01)

(52) U.S. Cl.
  CPC ... *H04N 21/4394* (2013.01); *H04N 21/43615* (2013.01); *H04N 21/44008* (2013.01); *H04N 21/6581* (2013.01); *H04N 21/8113* (2013.01); *H04N 21/8352* (2013.01); *H04N 21/8358* (2013.01)

(58) Field of Classification Search
  CPC ......... H04N 21/44008; H04N 21/6581; H04N 21/8113; H04N 21/8352; H04N 21/8358
  USPC ....................................................... 386/201
  See application file for complete search history.

(56) References Cited

U.S. PATENT DOCUMENTS

| | | |
|---|---|---|
| 2009/0125310 A1 | 5/2009 | Lee et al. |
| 2011/0021136 A1* | 1/2011 | Patsiokas ............... H04H 40/90 455/3.06 |
| 2011/0276333 A1 | 11/2011 | Wang et al. |
| 2013/0038711 A1* | 2/2013 | Sato ................... A61B 1/00048 348/68 |
| 2015/0281288 A1* | 10/2015 | Levinson ............... H04L 47/41 709/219 |

OTHER PUBLICATIONS

Technicolor "Sync Audio Watermarking" The Synchronization Technology for live, time-shifted or recorded content on any main screen device, 2012, 4 pages.

* cited by examiner

SEAMLESS PLAYBACK OF MEDIA CONTENT USING DIGITAL WATERMARKING

CROSS REFERENCE TO RELATED APPLICATION(S)

This application is a 35 U.S.C. §371 National Phase Entry Application from PCT/CN2013/079501, filed Jul. 17, 2013, designating the United States, the disclosure of which is incorporated herein in its entirety by reference.

TECHNICAL FIELD

The present invention relates to methods, apparatus and systems for providing seamless or substantially synchronous playback of media content from one media device to another using digital watermarking.

BACKGROUND

The term "Internet of Things" has come to describe a number of technologies and research disciplines that enable the Internet to reach out into the real world of physical objects. Technologies like RFID, short-range wireless communications, real-time localization and sensor networks are now becoming increasingly common, bringing the Internet of Things into commercial use.

For example, communications devices, such as mobile telephones or personal computers, allow a subscriber to attach to a communication network and communicate with other devices. Furthermore, a growth area is that of machine-to-machine (M2M) communication, in which communications are sent between different devices without human intervention. Examples of the use of M2M communication include sensor networks (for example, networks for monitoring weather conditions), surveillance equipment (for example alarm systems, video monitoring, and so on), vehicle fleet management, vending machines, monitoring manufacturing and so on.

It is predicted that in the long term future, there will be billions of M2M devices, and the number of M2M devices will far exceed the number of devices used for communication between humans (such as mobile telephones, personal computers and so on).

These technologies foreshadow an exciting future that closely interlinks the physical world and cyberspace or the Internet—a development that is not only relevant to researchers, but to corporations and individuals alike. The vast number of connected devices has the capacity to create additional services for users by connecting devices to enable M2M communication in areas such as entertainment, government, health, transportation, utilities, manufacturing, financial services and retail.

A connected device may comprise or represent any device used to connect to or access wired or wireless communication networks and communicate with other devices. Examples of connected devices that may be used in certain embodiments of the invention are wired or wireless devices such as computers, mobile telephones, terminals, smart phones, portable computing devices such as lap tops, hand-held devices, tablets, net-books, personal digital assistants and other devices that can connect and communicate over a wired or wireless communication network.

Media content may comprise or represent any data or signal used to convey information and ideas in different content forms. Examples of media content that may be used in certain embodiments of the invention include, but are not limited to, audio data or content, image data or content, video data or content, audiovisual data or content or multimedia content. Media content may be represented in a digital format.

Media devices may comprise or represent any device used to playback media content to an end user. Examples of media devices that may be used in certain embodiments of the invention are devices such as computers, mobile telephones, terminals, smart phones, set-top boxes, media players, video and DVD players, televisions, home entertainment systems, hi-fi systems, speakers or speaker systems, portable computing devices such as lap tops, handheld devices, tablets, net-books, personal digital assistants, connected devices capable of receiving media content and playback of the media content, and other devices that can receive and playback media content.

Distribution of media content such as audio, audiovisual or multimedia content to end users is becoming evermore problematic because the media content, in particular media content in a digital format (e.g. digital media content) is easily copied and can be distributed without the permission of the owner of the media content. Digital rights management (DRM) techniques may be used to limit the use of media content to only authorized end users. DRM may include digital watermark technology that may be incorporated into the media content in an attempt to identify the content owner, who is authorized to view the content, identity of the content and/or other information.

A digital watermark is data representative of a marker that is covert embedded in a noise-tolerant signal such as media content such as audio, image, video or audiovisual content or data. It is typically used to identify ownership of the copyright of such signal. "Watermarking" is the process of hiding digital information in media content (a carrier signal); the hidden information should, but does not need to contain a relation to the carrier signal. Digital watermarks may be used to verify the authenticity or integrity of the carrier signal or to show the identity of its owners.

Given the propensity for end-users to buy and/or download digital media content, which can be easily copied, some DRM technologies have been developed and used that can restrict the number of devices that may playback the media content and, also, who may access the media content. Unfortunately, these DRM technologies are quite inflexible leading to a poor user experience and frustration when attempting to playback the DRM protected media content on multiple media devices of the end-user. In addition, different media devices have different capabilities such that one type of media content is not necessarily suitable for playback on another media device. For example, audiovisual media content designed for playback on a smart-phone display may not be suitable for playback on a high-definition television.

Therefore, there is a significant need to optimise the distribution of media content to end-users to minimise the delays and frustration caused by attempts to playback media content on legitimate end user devices that may not necessarily be authorised to playback the media content, and that have different capabilities.

SUMMARY

It is an object of the invention to provide end-users with methods, apparatus and systems for providing the end-user with access to suitable media content by transferring and/or synchronizing playback of the media content from one device to another media device while minimizing end-user involvement. M2M technologies may assist in this area. In particular, digital watermarks may be used in the transfer and/or substantially synchronised playback of media content from one of the media devices to another.

According to a first aspect of the invention, there is provided a method for a media device to playback media content. The method includes detecting playback of the media content output from a second media device in which the media content is captured and stored. The method includes identifying the media content and a content provider from the captured media content. The identified media content is downloaded from the content provider and playback of the downloaded media content from the media device is substantially synchronised with the playback of the media content output from the second media device.

As an option, identifying the captured media content and the content provider further includes sending at least a portion of the captured media content to a M2M platform or service provider platform for determining the identity of the media content and content provider, and receiving, in response from the M2M platform or provider, an indication of the identity of the media content and the content provider associated with the captured media content.

Optionally, the media content includes a digital watermark for identifying the content provider and the media content, and the captured media content includes data representative of the digital watermark. Additionally, the digital watermark may be embedded within the media content at a plurality of locations in the media content.

Optionally, detecting playback of the media content output from a second media device further includes detecting playback of the media content output in an analogue format from the second media device, and capturing and storing the media content further includes capturing and storing the media content in a digital format.

As an option, the captured media content includes a plurality of frames of an audio signal corresponding to the audio signal of the media content, and the downloaded media content includes a plurality of frames of an audio signal corresponding to the audio signal of the identified media content. Substantially synchronising the playback may include starting playback of the downloaded media content from an audio signal frame of the downloaded media content based on the most recently captured audio signal frame of the captured media content. Alternatively or additionally, the digital watermark may further include a timestamp signal or data representative of a timestamp, and substantially synchronising the playback further includes starting playback of the downloaded media content from an audio signal frame of the downloaded media content based on the timestamp signal. The frame length of each audio frame of the captured media content and the downloaded media content may represent substantially the same time interval or may represent different time intervals, and/or the frame length of the audio frames may represent varying time intervals.

Optionally, substantially synchronising the playback may further include cross-correlating at least one of the audio signal frames of the captured media content with the plurality of audio signal frames of the downloaded media content to determine the most likely starting point for playback of the downloaded media content. As an option, the steps of downloading and substantially synchronising the playback, and playback of the downloaded media content may be performed concurrently after a sufficient portion of the downloaded media content has been downloaded such that synchronisation and playback of the downloaded media content can occur on the first media device.

According to a second aspect of the invention there is provide a method for identifying captured media content for playback on a media device based on playback of media content output from a second media device. The method including receiving at least a portion of the captured media content from the media device, determining the identity of the media content and content provider, and transmitting an indication of the identity of the media content and the content provider for use by the media device in playback of the identified media content.

As an option, determining the identity of the captured media content and the content provider further includes sending at least a portion of the captured media content to an analysis module for determining the identity of the media content and content provider, and receiving the indication of the identity of the media content and the content provider associated with the captured media content.

Optionally, the media content includes a digital watermark comprising data representative of the content provider and the identity of the media content, and the captured media content includes data representative of the digital watermark, where determining the identity of the media content and content provider further includes detecting, extracting and reading the digital watermark in the captured media content.

As an option, the method of identifying may be performed, at least in part, by an M2M platform. The media content may be audio media content or audiovisual media content.

According to a third aspect of the invention there is provided a media device including a receiver, a transmitter, a memory unit, a capture device, a media playback device, and a processor, the processor being connected to the receiver, to the transmitter, to the memory unit, to the capture device, and to the media playback device. The processor and capture device are configured to detect playback of the media content output from a second media device in an analogue format, and capture the output media content in a digital format. The memory unit is configured to store the captured media content. The processor is further configured to identify the media content and a content provider from the captured media content. The receiver and transmitter are configured to download the identified media content from the content provider. The processor and media playback device are configured to substantially synchronise playback of the downloaded media content from the media device with the playback of the media content output from the second media device.

Optionally, the transmitter and processor are further configured to send at least a portion of the captured media content to service provider (e.g. a M2M platform) for determining the identity of the media content and content provider, and the receiver is further configured to receive, in response from the M2M platform, an indication of the identity of the media content and the content provider associated with the captured media content.

According to a fourth aspect of the invention there is provided a service provider system or platform including a receiver, a transmitter, a memory unit, and processor, the processor being connected to the receiver, to the transmitter, and to the memory unit. The receiver is configured to receive at least a portion of the captured media content from the media device. The processor is configured to determine the identity of the media content and content provider. The transmitter is configured to transmit an indication of the identity of the media content and the content provider for use by the media device in playback of the identified media content.

As an option, the transmitter may be further configured to send at least a portion of the captured media content to an analysis module for determining the identity of the media content and content provider, and the receiver may be further configured to receive the indication of the identity of the media content and the content provider associated with the captured media content.

BRIEF DESCRIPTION OF THE DRAWINGS

In order that the invention may be more fully understood, some of the embodiments of the invention will now be described, by way of example only, with reference to the accompanying drawings, in which.

DETAILED DESCRIPTION

The following detailed description of the exemplary embodiments refers to the accompanying drawings. The same reference numbers in different drawings identify the same or similar elements. Also, the following detailed description does not limit the invention. The following embodiments are discussed, for simplicity, with regard to the terminology and structure of exemplary systems. However, the embodiments to be discussed next are not limited to such exemplary systems but may be applied to other telecommunications systems.

In order to overcome the problems identified above with present distribution systems, methods and apparatus are described for use in transferring and synchronising playback of media content from one device to another. It has been recognised that more and more media devices are using networks for connectivity (e.g. mobile phones, smart phones, and laptops, tablet computers, set-top boxes, televisions, radios and other devices). Surprisingly, many of these devices are not arranged with the ability to transfer and synchronise playback of media content from one device to another.

The basic concept of the invention is to provide a mechanism for transferring and/or synchronizing playback of media content from one media device to another in a seamless fashion. A media device may be arranged to detect playback of media content from another media device. The media device captures a portion of the media content being played back and identifies the captured media content and content provider. The media device contacts the content provider and receives, downloads or streams the identified media content from the content provider, while also synchronising playback or play out of the identified/downloaded/streamed media content on the media device with the playback of the media content on the other device. The media content may be embedded with a digital watermark for identification of the media content and the content provider. If necessary, an M2M platform may assist the media device in identifying the media content and content provider from the captured media content. The M2M platform may also act as an intermediary between the media device and the content provider.

Figure 1B:
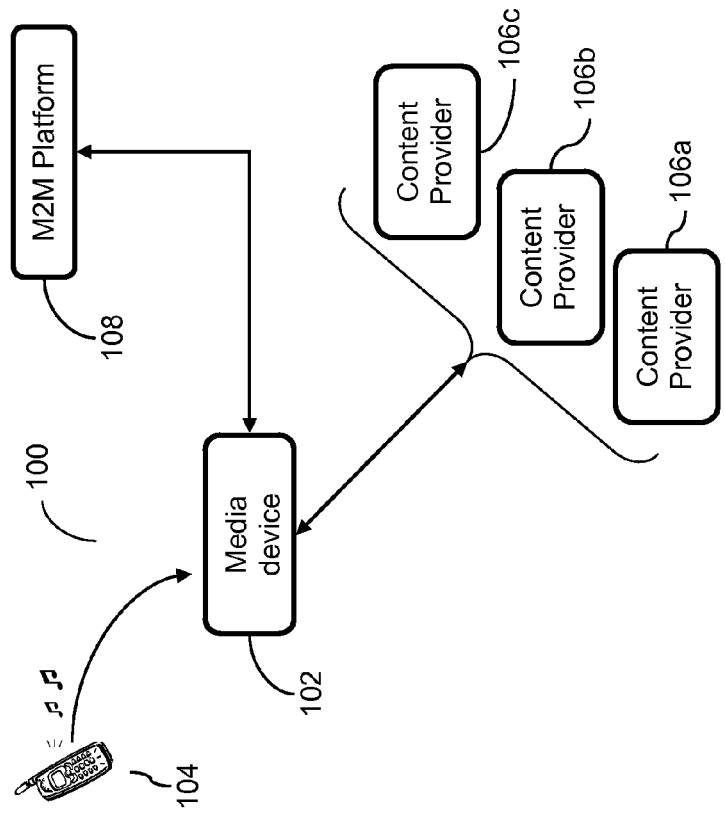
FIGS. 1a and 1b are schematic illustrations of example systems of media devices playing out media content according to the invention.
Figure 1A:
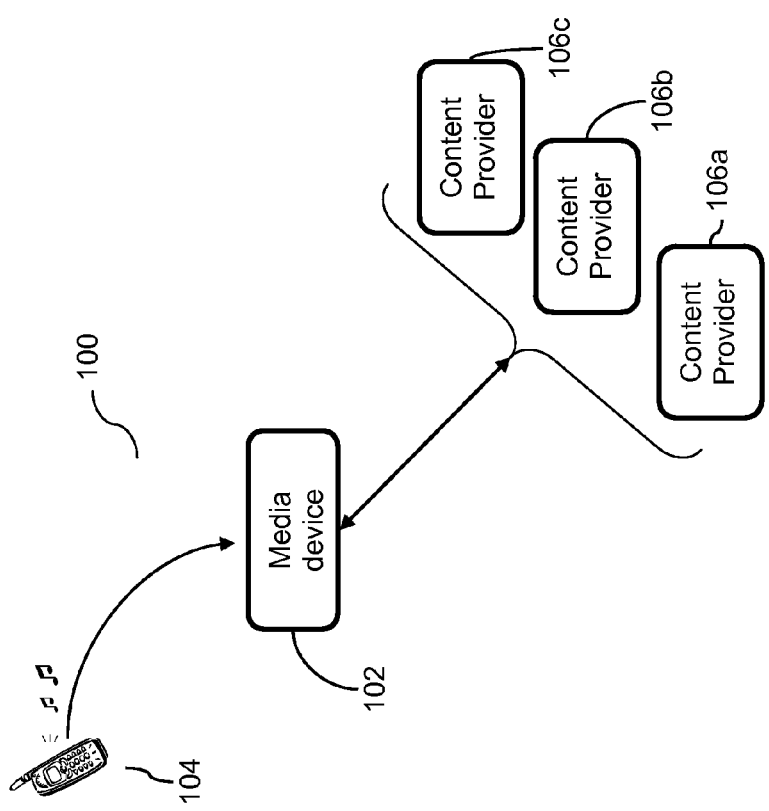

FIG. 1a is a schematic illustration of an example distribution system 100 comprising a first media device 102 (e.g. a set-top box, internet connected television set or home entertainment or speaker system etc), a second media device 104 (e.g. a mobile telephone, smart-phone, or tablet), and content providers 106a-106c that may provide media content to the media devices 102 and 104. It is assumed that the second media device 104 already has media content stored thereon, for example, music for playback over the speakers of the second media device 104. The first media device 102 is arranged to connect over a communication network (e.g. the Internet) with content providers 106a-106c.

In operation, the first media device 102 is arranged to detect playback of the media content output from the second media device 104, identify the detected media content, retrieve the detected media content from one or more content providers 106a-106c in a suitable form, and synchronise playback of the media content from media device 102 with playback of the media content from media device 104.

Media device 102 may have a microphone and a processor that are arranged to detect playback of the media content that is output from the second media device 104. For example, detection of media content may be achieved by detecting a level or threshold of an audio signal over and above the ambient noise level of the environment. In this example, the second media device 104 may be playing back music to the end user, which is output from the speaker of the second media device 104 as sound in the form of an analogue audio signal. After detecting that media content is being played back from the second media device 104, the first media device 102 captures and stores, or records via the microphone and processor, the media content and encodes the captured media content in a digital format (e.g. an MP3 or other digital audio format). The media content may originally have had a digital watermark applied to it, such that the captured media content will include a digital representation of the digital watermark.

In this example, during the capture and storing of the media content, the first media device 102 may include the processing power to detect and decrypt the digital watermark from a portion of the captured media content. Depending on the digital watermark, this may allow the first media device 102 to identify the media content that is being played back by the second media device 104 and also to identify the content provider from which to retrieve the media content. The first media device 102 may then connect with or contact the identified content provider 106a for receiving or downloading the identified media content.

The identified media content may be received, downloaded or streamed over the communication network from the content provider while the second media device is still playing back the media content. The term downloading media content will be used, however, it is to be appreciated that this may include transmitting a request for the media content from a content provider 106a and receiving a response form the content provider 106a including receiving the identified media content. Once the identified media content is received downloaded, or is being received or at least partially downloaded to allow synchronisation with the playback of the media content on the second media device 104, the first media device 102 then substantially synchronises playback of the identified media content (which has been downloaded, also referred to as downloaded media content) for output from the first media device with the playback of the media content output from the second media device. The first media device 102 plays back the identified media content, which is output from the first media device 102 (e.g. via speakers, displays or other forms of output) once the point of play in the media content being played back from the second media device 104 has been substantially determined. Playback need not be exactly synchronous, as there may be errors in synchronisation, frame rates, delays etc, and so playback may be regarded as substantially synchronous or synchronised if playback begins in the vicinity of the current output of the media content from the second media device 104. If it is not possible to fully synchronise playback, the end user may simply turn off the second media device 104 and enjoy the playback from the first media device 102, or even begin playback from the first media device 103 from the beginning of the identified and downloaded media content.

In this way, a user can autonomously and seamlessly without invoking the media devices manually have the same music played from both devices, or effectively have the playback of the music from the second media device transferred to the first media device as he/she moves around the environment. This is achieved by using digital watermarking techniques in audio signals and leveraging internet connected devices. This concept may also be extended to audiovisual media content e.g. audio and video streams, movies in which the audio signal from the audio stream of the audiovisual media content is used to detect the playback of the media content, capture the digital watermark, identify and download the audiovisual media content, and synchronise playback of the audiovisual media content on the first media device 102. In this case, the first media device 102 may have a display or is able to be coupled to a display such as a television during playback of the audiovisual media content.

Although the identified media content needs to be downloaded to the first media device 102, it is to be appreciated by the person skilled in the art that not all of the media content is required to be fully downloaded before synchronizing the playback of the downloaded media content with the media content output from the second media device 104. When downloading the identified media content, the first media device 102 does not need to wait for the full download to complete as synchronization may occur after a sufficient portion of the identified media content has been downloaded to the first media device 102. After synchronizing, the remaining identified media content can be downloaded or streamed during playback of the identified/downloaded media content. This will reduce the delay between downloading the identified media content and synchronizing the playback of the downloaded media content, which will be the case for media content such as audiovisual media content.

In some cases a digital watermark may be embedded in the media content, to minimise the requirement of requiring the capture of the entire media content, the digital watermark may be embedded within the media content at a plurality of locations in the media content. For example, depending on the size of the data in the digital watermark, the digital watermark may be repeated within the media content every 10-30 seconds or any other suitable repeating time interval. This means that only a portion of the captured media content larger than the repeating time interval is required for detecting and extracting the digital watermark and identifying the media content and the content provider. This means that the identified media content may be downloaded onto the first media device 102 while the media content is still being played back allowing the first media device 102 to substantially or roughly synchronise the playback of the downloaded media content with the playback of the media content output from the second media device 104.

The downloaded media content and the media content being played back form the second media device may be synchronised using the properties of standard digital audio formats (e.g. lossless or lossy audio codecs, Moving Picture Experts Group (MPEG)-1 or MPEG-2 Audio Layer III also known as MP3, or Advanced Audio Coding (AAC) or known as High-Efficiency AAC which is part of MPEG-4 Audio, and the like) or using the properties of the audio component/portion of audiovisual media content in a the digital format (e.g. lossless or lossy video codecs, MPEG-1, MPEG-2, MPEG-4, Windows Media Video, H.261-H.263, H.264/MPEG-4 AVC, and the like). It will be appreciated that the media content may be in any other appropriate format that allows the downloaded media content to be synchronised to the media content and played back via the first media device 102. MP3 and AVC will be used for simplicity and by way of example only in the description below, which it will be appreciated by the person skilled in the art that media content in other audio and audiovisual formats are also applicable.

MP3 is currently known for audio streaming or storage, and is the current de facto standard for digital audio compression for the transfer and playback of music on most media devices (e.g. digital audio/media players). AAC is designed to succeed the MP3 format for digital audio and has been standardized to be part of the MPEG-2 and MPEG-4 specifications, and part of which is also adopted, by way of example only, into digital radio standards like digital audio broadcast (DAB) or DAB+, Digital Radio Mondiale, as well as mobile television standards DVB-H and ATSC-M/H.

Both the MP3 and AAC formats digitally represent an audio signal by a sequence of frames including a header and an audio data payload. For MP3, each frame represents a constant interval of time of the audio signal (e.g. a constant frame length), whereas in AAC, each frame may represent a variable internal of time of the audio signal (e.g. a variable frame length) depending on the structure of the audio signal. For simplicity, synchronisation will be described, by way of example only, with respect to an audio signal in the MP3 format, but it is to be appreciated by a person skilled in the art that these concepts may be applied to other digital audio formats such as AAC.

As each frame of audio media content in the MP3 digital format represents a constant interval of time of the audio signal, synchronisation can be substantially achieved by counting the number of frames of the audio portion of the captured media content. Assuming the audio portion of the media content played back from the second media device 104 is in the MP3 format and playback began from the start of the media content (e.g. from the first frame), and assuming that capturing and storing the captured media content in the MP3 digital format also began on detecting the playback of media content from the second media device 104, then the current frame count of the captured media content or the most recently captured audio signal frame may be used as an offset to determine when playback of the downloaded media content in the MP3 format can begin. This means that the playback of the downloaded media content and the playback of the media content output from the second media device 104 will be substantially synchronised, e.g. synchronised to within at least several audio frames of each other.

If the media content is audiovisual media content in the MPEG-2 format, which is a standard for coding of moving pictures and associated audio information, then the captured media content will be the audio portion of the media content, which may be in the MP3 format. The downloaded media content will be the identified audiovisual media content in the MPEG-2 format, which was identified using the digital watermark in the audio portion of the captured media content. Synchronisation may be achieved by starting the audio frames of the downloaded media content based on the current frame count of the captured audio media content and starting the video frames of the downloaded media content based on the corresponding audio frames, which means that the playback of the downloaded media content will be substantially synchronised with the playback of the media content.

Synchronisation may be achieved by the first media device 102 by starting a frame counter when starting to capture the audio signal of the media content, and incrementing the frame counter for each captured frame of the audio signal of the media content when capturing and encoding the captured media content in the MP3 digital format. The most recently captured audio signal frame of the captured media content may then be determined by reading the current frame count of the frame counter, and starting playback of the downloaded media content based on current frame count.

This assumes that captured media content in the digital format includes a plurality of frames of an audio signal corresponding to the audio signal of the media content, and the downloaded media content also includes a plurality of frames of an audio signal corresponding to the audio signal of the identified media content, where the frame length or time interval represented by each audio frame of the captured media content and the downloaded media content represents substantially the same time interval (e.g. as in the MP3 format). Of course, the frames of the captured and downloaded media content may represent different time intervals (e.g. $T_C$ may be the time interval for each captured audio frame and $T_D$ may be the time interval for each downloaded audio frame, where $T_C \neq T_D$) then the frame offset from which to begin playback of the downloaded media content may be adjusted by multiplying the current frame count of the captured media content with the ratio $T_C/T_D$.

However, if the playback of the media content from the second media device does not occur at the beginning of the media content, then there may be an issue in relation to synchronising playback of the downloaded media content with that of the media content from the second media device as the first media device 102 may not be able to determine the offset of the captured media content correctly. This may be alleviated if the digital watermark further includes a timestamp signal, which may be detected and extracted by the first media device 102. The timestamp signal may be used in conjunction with the current frame count of the captured media content to substantially synchronise the playback by starting playback of the downloaded media content from an audio signal frame of the downloaded media content based on the timestamp signal and the offset. Alternatively or additionally, substantially synchronising the playback may further include cross-correlating at least one of the audio signal frames of the captured media content with the plurality of audio signal frames of the downloaded media content to determine the most likely starting point for playback of the downloaded media content such that the playback of the downloaded media content.

Although the media content, captured media content, and downloaded media content has been described in relation to the MP3 format, it is to be appreciated by the person skilled in the art that any audio format or audio component of an audiovisual format may be used. For example, if the AAC format is used in which each frame represents a variable time interval of the audio signal, then substantial synchronisation may still be achieved by using the above frame counting method for synchronising playback of the downloaded media content on the first media device 102 to the playback of the media content from the second media device 104.

FIG. 1b is a schematic illustration of another example distribution system 100 including first media device 102, second media device 104 (e.g. a mobile telephone or a tablet), an machine-to-machine (M2M) platform 108 provided by a service provider, and content providers 106a-106c that may provide media content to the media devices 102 and 104. It is assumed that the second media device 104 already has media content stored thereon, for example, music for playback over the speakers of the second media device 104. The first media device 102 is arranged to connect over a communication network (e.g. the Internet) to the M2M platform 108 and also with content providers 106a-106c.

In operation, the first media device 102 is arranged to detect playback of the media content output from the second media device 104. However, in this example, the first media device 102 may not have the required processing power, software or hardware required to identify the detected media content. Instead, the first media device 102 may send a portion of the captured media content to the M2M platform 108 of the service provider for identification of the media content and the content provider from which to retrieve the identified media content. On receiving this information from the M2M platform 108, the first media device 102 may then download or retrieve the identified media content from one of the content providers 106a-106c in a suitable form, and synchronise playback of the downloaded media content from media device 102 with playback of the media content from media device 104. Synchronising playback of the downloaded media content may be achieved as described with respect to FIG. 1a.

In order to identify the captured media content, the first media device 102 sends at least a portion of the captured media content to the M2M platform of the service provider 108. The M2M platform 108 may then use its resources to determine the identity of the media content and content provider 106a-106c associated with the captured media content. The first device 102 may then receive, in a response message from the M2M platform 108, information including at least an indication of the identity of the media content and the identity or address of the content provider or website/server from which the identified media content may be retrieved that may be used to connect with and download the identified media content.

The M2M platform 108 may include various M2M applications that provide various services to users or devices connected over the communication network (e.g. Internet). In this case, M2M platform 108 may provide an M2M media distribution application that provides a subscription service to the user of the first media device 102 such that the user of the first media device 102 is authorised, by the response from the M2M platform 108, to download the identified media content from the content provider 106a.

This means additional authorisation/payment may not necessarily be required from the content provider 106a as this will be covered by the subscription service. In this way, the M2M platform 108 acts in such a way as to authorise the distribution of the identified media content from content provider 106a to the first media device 102.

The end user of the second and first media devices 104 and 102 may have registered or subscribed with a service associated with the M2M media distribution application. The registration may also include registering the identities of the first and/or second media devices with the M2M platform 108. When the first media device 102 sends at least a portion of the captured media content to the M2M platform 108, it may include the identity of the end user and/or the identity of the first media device 102 such that the M2M application may provide, in its response, an authentication token or other indicator or permission that will allow the first media device 102 to download the identified multimedia content from the content provider. If the first media device 102 is not registered and/or the end user is not registered with the M2M platform 108, then the M2M media distribution application may refuse to serve or provide permission to the first media device 102 to download the identified media content. This may be overcome by the end user subscribing to the service of the M2M media distribution application or registering the first media device etc. In this way, M2M application may be able to distinguish between authorised and unauthorised end users and media devices. The first user device 102 may then send a request including the authorisation/permissions/authentication token etc and identity of the media content to the content provider 106a. On receiving the request, the content provider 106 may then, based on the information associated with the authorisation/permissions/authentication token etc and identity of the media content send the identified media content to the first media device 102. The content provider 106a may also embed into the identified media content a digital watermark including the identity of the media content, an identity of the content provider 106a, and/or the identity of the end user and/or the first media device 102, or other information associated with distribution and protection of the identified media content. This may be used by another media device in the same way as the first media device 102 retrieved the media content.

If the M2M platform 108 does not include the resources for identifying the captured media content and the content provider, the M2M platform 108 may also send at least a portion of the captured media content to an analysis module (not shown) for determining the identity of the media content and content provider. The analysis module may be another M2M application or another computing device that may analyse the captured media content to determine its identity and also the identity of the content provider 106a from which first media device 102 may retrieve the identified media content. The M2M application may receive a response from the analysis module with an indication of the identity of the media content and the content provider associated with the captured media content. This is forwarded back to the first media device 102 for retrieving the media content.

The first media device 102 may also send information associated with the capabilities or identification of the first media device 102 to the content provider 106a such that the content provider 106a will provide the identified media content in an appropriate media format for playback of the media content on the first media device 102. This allows the content provider 106a to provide the best quality media content to the first media device 102 that is optimised for playback on the first media device 102, alternatively, the best quality media content provided may be that which allows a fast download/transmission rate to the first media device 102, without compromising too much on quality.

As described with respect to FIG. 1a, the media content that is being played back from the second media device 104 may include a digital watermark including data representative of the content provider 106a and the identity of the media content. This means that the captured media content may also include data representative of the digital watermark, which may be detected, extracted and interpreted or read by analysing at least a portion of the captured media content. Either the M2M platform or the analysis module may perform this function.

Although the first and second media devices 102 and 104 have been described in which the first media device 102 may be a set-top box or speaker system and the second media device 104 may be a mobile phone or a tablet etc, it is to be appreciated by the person skilled in the art that the first and second media devices 102 and 104 may be any media device in which at least the first media device 102 is a connected media device, i.e. has access or is able to connect to a wired or wireless communications network (e.g. the Internet, second, third, fourth generation and beyond type networks, and future communication network etc) for communicating with the content providers 106a-106c and/or the M2M platform.

Figure 2:
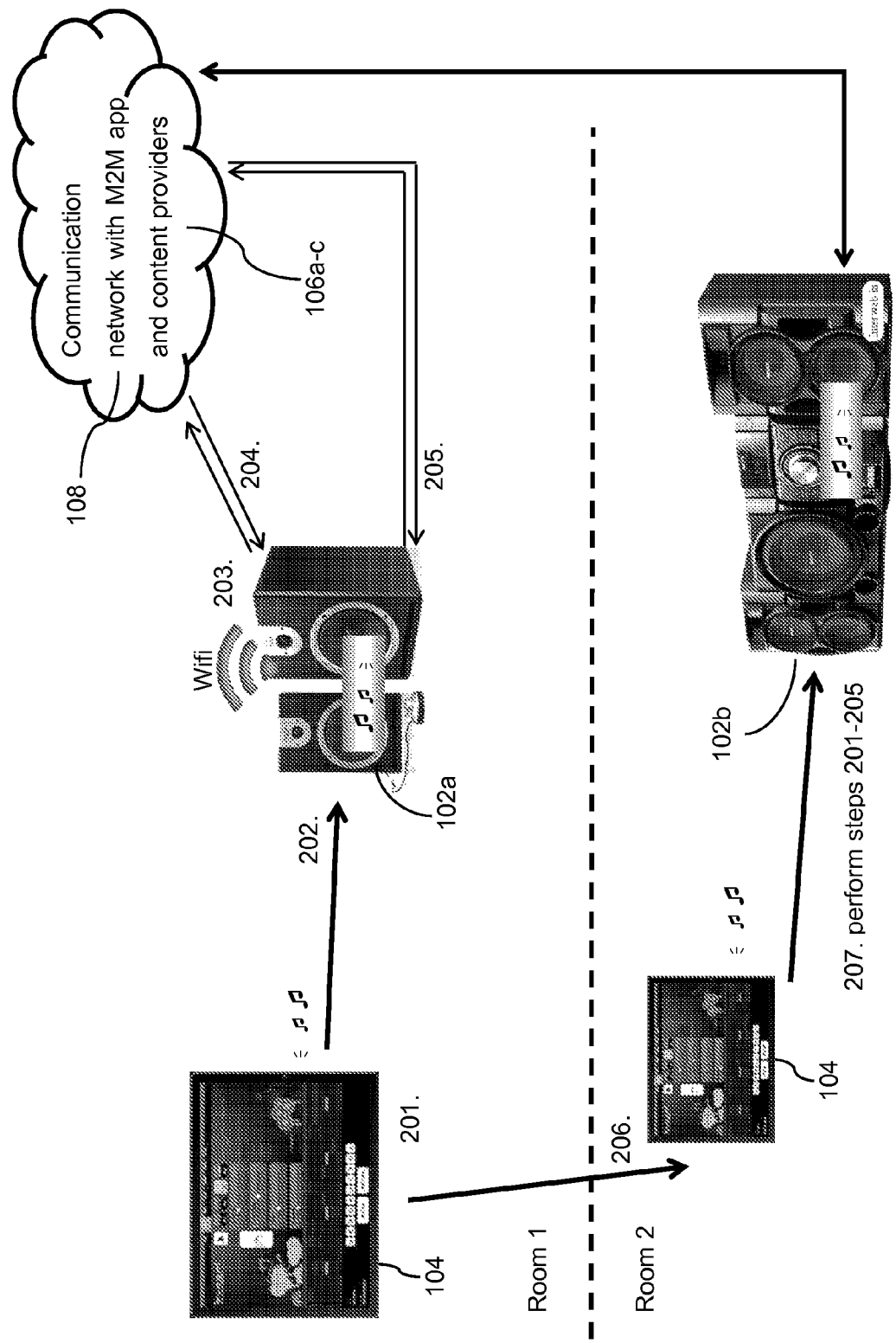
FIG. 2 is a schematic illustration of another example system of media devices playing out media content according to the invention.

FIG. 2 is a schematic illustration of another example distribution system 100 including a first media device 102a (e.g. a Wi-Fi speaker system) in a first room (e.g. Room 1), second media device 104 (e.g. a tablet), a third media device 102b in a second room (e.g. Room 2), and a communications network 200 including an M2M platform 108 provided by a service provider and content providers 106a-106c. The first and third media devices 102a and 102b are connected devices that may communicate with other devices such as M2M platform 108 and content providers 106a-c. It is assumed that the second media device 104 already has media content such as music or video stored thereon for playback over the speakers/display of the second media device 104. The first media device 102a and the third media device 102b are arranged to connect with M2M platform 108 and also with the content providers 106a-106c via the communication network 200 (e.g. the Internet).

This example describes how an end user of second media device 104 may autonomously and seamlessly, without invoking the first and third media devices 102a and 102b (e.g. the Wi-Fi speaker systems) manually, play the same media content such as music or video as they move around the environment (e.g. from Room 1 to Room 2) using the digital watermarking technique in audio signals and also leveraging the M2M concept of connected devices (e.g. wireless Internet speakers in this case). The environment may be a home environment in which there are typically more media devices (e.g. multiple speakers or speaker systems in multiple rooms) that may be connected devices (e.g. Wi-Fi speakers or speaker systems).

The operation of the distribution system 100 is described by the following steps:

201. The end user of the second media device 104 is located in the first room (e.g. Room 1) and may be listening to media content such as music, which is played back from the speaker of the second media device. The second media device 104 may be a mobile device such as a tablet, mobile phone, MP3/MP4 player etc. The audio signal that is output of the speaker during playback will be a sound wave having high and low frequencies. The first media device 102a is a Wi-Fi speaker which is in the first room and may detect the audio signal output from the second device during playback of the media content. It is assumed that the audio signal is digitally watermarked with information such as the identity of the media content and the identity of the content provider 106a (e.g. the source of the media content represented by the audio signal), which is embedded at a certain instances of time.

202. The first media device 102a in the first room detects the audio signal, if it is off or in standby; it may power on, and captures the signal via a microphone and encodes the audio signal into a captured audio stream based on a digital audio format (e.g. MP3 or AAC etc).

203. The first media device 102a then, via the Wi-Fi connection, sends the captured audio stream over the communication network 200 to an M2M platform 108 including an M2M media distribution application.

204. The M2M application, which can be a service provided as part of a "Smart Home" service by service providers or operators, receives the captured audio stream or a portion of it that includes the digital watermark, decodes the digital watermark and identifies the source media content and content provider 106a associated with the audio signal and captured audio stream. The M2M application sends this information back to the first media device 102a.

205. The first media device 102a receives the information from the M2M application and connects to the content provider 106a associated with the source media content. At the same time, the first media device 102a continues to capture audio signal output from the second media device 104. Once the source media content is downloaded from the content provider 106a, the first media device 102a uses the captured media content to substantially synchronise the downloaded media content with the playback of the media content from the second media device 104 as described herein. As soon as the point of play is reached, the first media device 102a begins playing the media content e.g. the speaker starts playing the audio signal from the source media content seamlessly, giving the end user a seamless play back of the media content from the first media device.

206. In time, the end user with the second media device 104 then moves from the first room (e.g. Room 1) to the second room (e.g. Room 2) in which a third media device 102b is located. The third media device 102b is similarly configured as the first media device 102a. The third media device 102b operates according to the steps as provided in steps 201 to 205. In this way, the end user has the impression that the service and the music follows them within the home environment.

Although the above steps have been described with respect to music or audio signals, it is to be appreciated by a person skilled in the art that the above steps may be applied to video signals or audiovisual media content in which playback of the audio signal of the audiovisual media content for the second media device 104 can be used to identify the source audiovisual media content, download the source audiovisual media content, and synchronise the playback of the downloaded audiovisual content with the playback of the as described with reference to FIGS. 1a and 1b.

Figure 3:
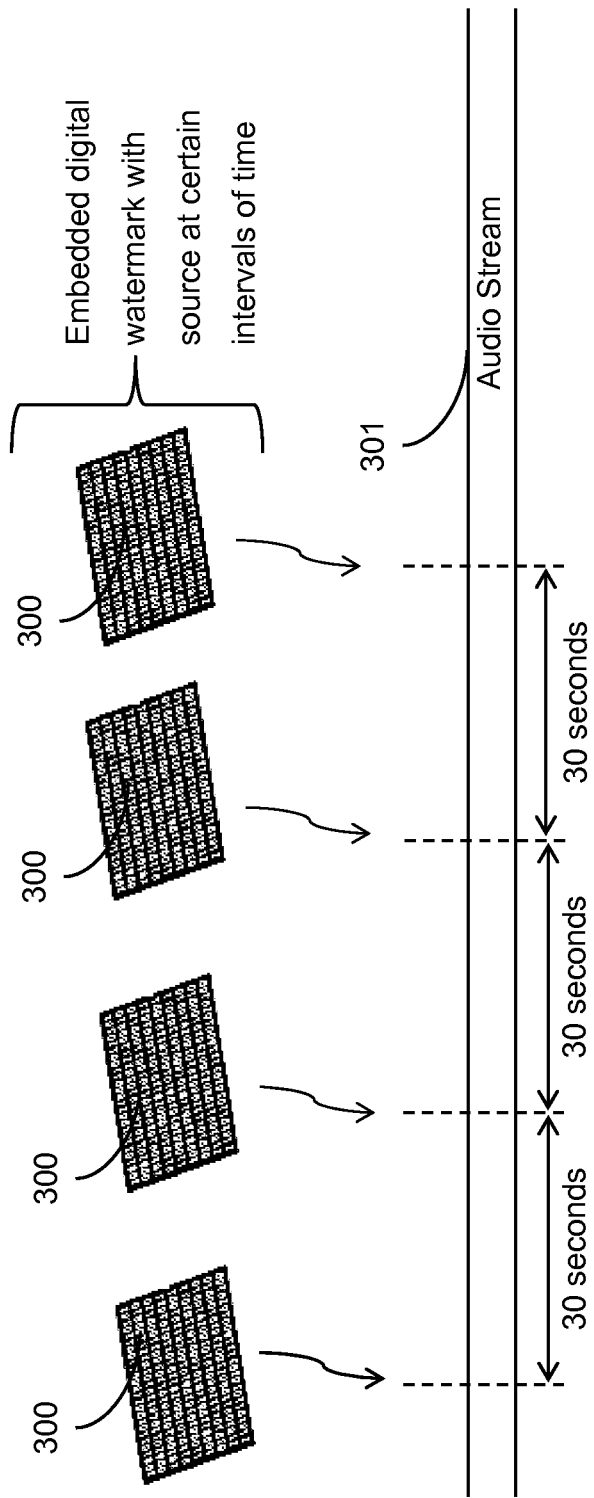
FIG. 3 is a schematic illustration of digital watermarking an audio stream for use with the present invention.

FIG. 3 is a schematic illustration of embedding a digital watermark 300 within a digital audio stream 301. As discussed previously, the digital watermark 300 is a marker that is covertly embedded in a noise-tolerant signal such as media content like audio, image, and/or video data. In this example, the media content is a digital audio stream 301.

The digital watermark 301 is typically used to identify ownership of the copyright of such signal. "Watermarking" is the process of hiding digital information in media content; the hidden information should, but does not need to contain a relation to the media content. Digital watermarks may be used to verify, among other things, the authenticity or integrity of the media content, identify of the media content, and/or to show the identity of its owners or content providers. Digital watermarks are only perceptible under certain conditions, for example, after using a detection/extraction algorithm, and are imperceptible at any other time.

As shown in this example, media content stream such as audio stream 301 may carry several digital watermarks at the same time. For example, the digital watermark 300 may be embedded in the media content at 30 second intervals. However, it is to be appreciated, that the frequency or time intervals for embedding the digital watermark 300 depends on the size of the information within the digital watermark 300. As described with reference to FIGS. 1a-2, it may be advantageous to embed the digital watermark 300 at multiple time intervals within the media content such as audio stream 301 such that the first device 102 is guaranteed to be able to quickly identify the media content and content provider identities, or is guaranteed in sending the digital watermark 300 within a captured portion of the audio stream 301. In this way, the first media device 102 may be able to begin playback of the downloaded media content while the media content is still being played back from the second media device.

Figure 4A:
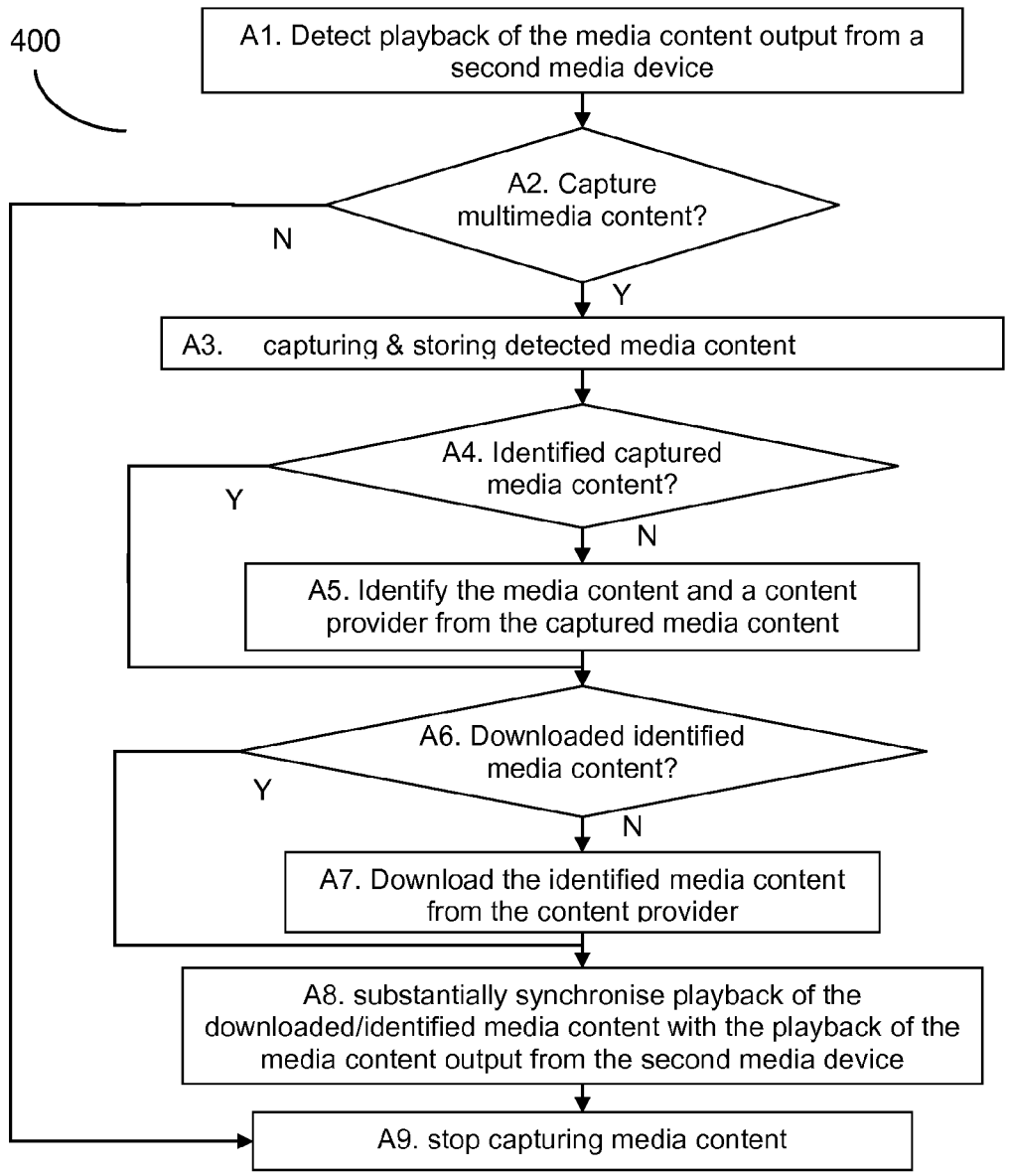
FIG. 4a is a flow diagram illustrating an example process for use with a media device according to the invention.

FIG. 4a is a flow diagram illustrating an example process 400 for use in playing back media content from a first media device. It is assumed that playback of the media content is being output from a second media device. The process 400 performed at the first media device may include the steps of:

A1. Detecting the playback of the media content output from a second media device. The first media device may include a microphone that detects an audio signal associated with the media content that may be output from a speaker of the second media device during playback, which means the audio signal can be an analogue signal such as sound.

A2. Determine whether to capture the multimedia content. The determination may include starting capture of the multimedia content and analysing a portion of the captured content to determine to whether the detected playback is actually the playback of media content instead of other sounds such as conversations or other background noise. If it is determined to capture the multimedia content, then proceed to A3, otherwise proceed to A9 to stop capturing the media content.

A3. Capturing and storing the audio signal associated with the detected media content. Capturing and storing may include digitally converting the audio signal and encoding into a digital format (e.g. MP3 or AAC or other suitable format) and storing in memory of the first media device. Proceed to A4.

A4. Determined whether the captured media content has been identified? If not, proceed to A5, otherwise proceed to A6.

A5. Identifying the identity of the detected media content and the identity of a content provider associated with the captured media content. This may include analysing a digital watermark embedded within the media content, which is preserved within the audio signal. This may be performed by the first media device, or by another entity such as an M2M platform. Proceed to A6.

A6. Determine whether the identified media content has been downloaded? If the identified media content has not been downloaded, then proceed to A7, otherwise proceed to A8.

A7. Downloading the identified media content from the identified content provider. This may include connecting over a communication network with the content provider, providing the identity of the media content, and receiving the identified media content from the content provider. Proceed to A8.

A8. Substantially synchronise playback of the download or identified media content output from the first media device with the playback of the media content output from the second media device. Synchronisation may include counting the frames of the captured media content and offsetting the start of play back of the downloaded media content based on the frame count. The downloaded media content is then played back. Proceed to A9.

A9. Stop capturing media content when playing back the downloaded media content. The captured media content may be removed from storage/memory as it should no longer be required.

Steps A7 and A8 of downloading and substantially synchronising the playback, respectively, and playback of the identified media content may be performed concurrently after a sufficient portion of the identified or downloaded media content has been received or downloaded by the media device such that synchronisation can occur and subsequent playback of the identified or downloaded media content can proceed during downloading of the remaining identified media content to be downloaded.

Figure 4B:
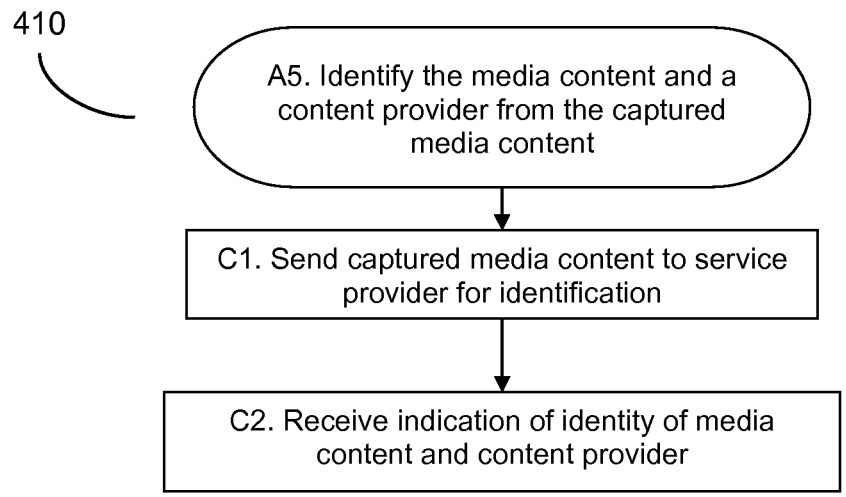
FIG. 4b is a flow diagram illustrating an example process for identifying media content for use with the media device according to the invention.

FIG. 4b is a flow diagram illustrating an example process 410 for use in identifying the captured media content in step A5. The process 410 performed at the first media device may include the steps of:

C1. Sending at least a portion of the captured media content to a service provider (e.g. an M2M platform or M2M distribution application) for determining the identity of the media content and identity of the content provider. Proceed to C2.

C2. Receiving, in response from the service provider, an indication of the identity of the media content and the content provider associated with the captured media content. The M2M platform or other resource may determine the identity by detecting/extracting/reading a data representative of a digital watermark embedded within the media content and preserved when the audio signal associated with the media content is captured.

Figure 4C:
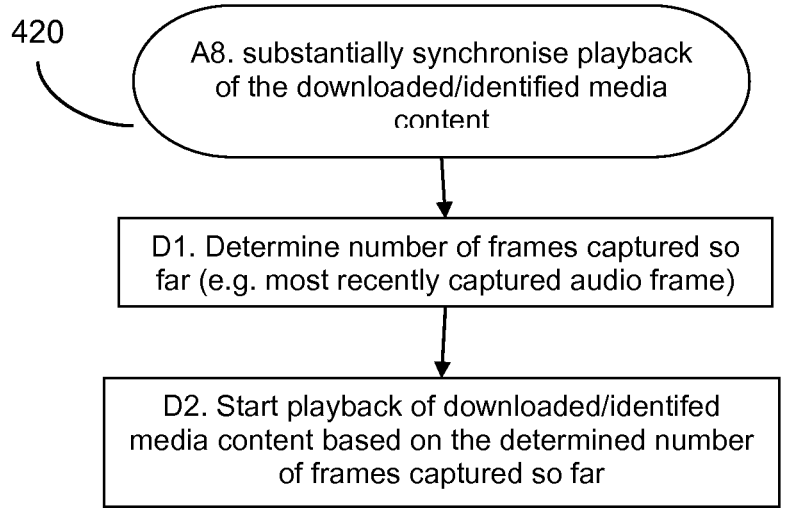
FIG. 4c is a flow diagram illustrating an example process for synchronising the play back of the media content.

FIG. 4c is a flow diagram illustrating an example process 420 for use in synchronising playback of the downloaded/identified media content according to step A8. The captured media content in the digital format may be encoded into a plurality of frames of audio signal data corresponding to the audio signal of the media content output from the second media device. The downloaded media content also includes a plurality of frames corresponding to the audio signal of the identified media content. The process performed by the first device may be outlined by the following steps:

D1. Determine the number of frames that have been captured so far. This should correspond to the most recently captured frame of the audio signal. Proceed to D2.

D2. Start playback of the downloaded/identified media content from an audio signal frame of the downloaded/identified media content based on the current number of frames or the most recently captured audio signal frame of the captured media content.

Synchronisation may also be achieved, by including into the digital watermark a timestamp signal, in which it is determined what frame number the timestamp signal represents, and starting playback of the downloaded media content from an audio signal frame of the downloaded media content based on the timestamp signal and also the most recently captured audio signal frame. Alternatively or additionally, substantially synchronising the playback may include cross-correlating at least one of the audio signal frames of the captured media content with the plurality of audio signal frames of the downloaded media content to determine the most likely starting point for playback of the downloaded media content.

Determining the number of frames of D1 may include incrementing a frame counter for each captured frame of the audio signal when capturing the media content encoded in the digital format. Determining the most recently captured audio signal frame of the captured media content by reading the frame counter to provide the current frame count. Starting playback of the downloaded media content based on current frame count.

As an option, the encoded digital format of the captured media content may be based on a constant frame length (e.g. MP3) or based on a variable frame length (e.g. AAC), such that the audio content of the downloaded media content is in substantially the same digital format as the captured media content.

Figure 5A:
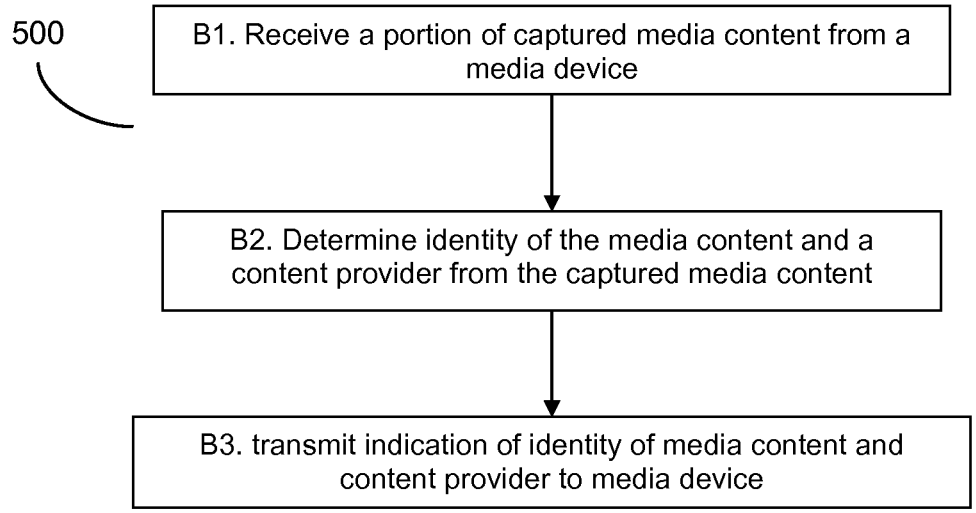
FIG. 5a is a flow diagram illustrating an example process for identifying media content according to the invention.

FIG. 5a is a flow diagram illustrating an example process 500 for use in identifying media content for playing back the identified media content from a first media device. It is assumed that playback of the media content is being output from a second media device and that the first media device captures the audio signal corresponding to the media content, the first device connects with another device or entity in a communication network for identifying the media content and downloading and playing back the identified media content. The process 500 performed at the other device or entity may include the steps of:

B1. Receiving at least a portion of the captured media content from the first media device.

B2. Determining the identity of the media content and the identity of the content provider. The identity of the content provider may include an IP address or website address from which the first media device may use to download the identified media content.

B3. Transmitting data representative of an indication of the identity of the media content and the content provider for use by the first media device in playback of the identified media content.

Figure 5B:
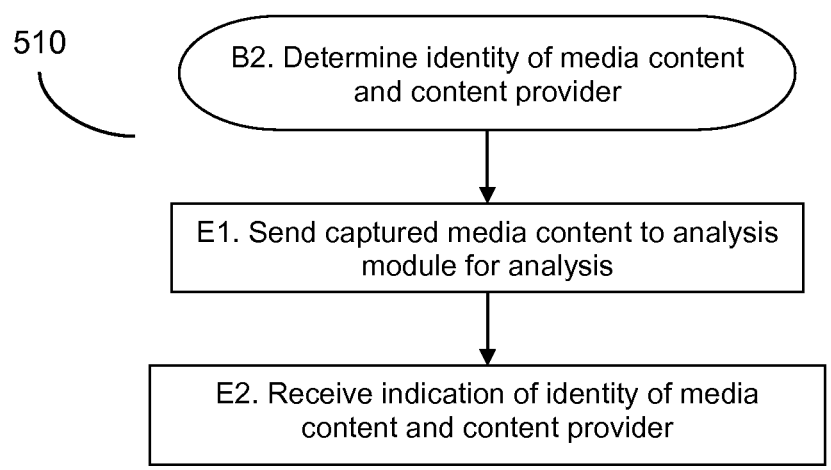
FIG. 5b is a flow diagram illustrating another example process for determining the identity of the media content according to the invention.

FIG. 5b is a flow diagram illustrating an example process 510 for use in determining the identity of the captured media content of step B2. The process performed by the entity may include the following steps of:

E1. Sending at least a portion of the captured media content to an analysis module for determining the identity of the media content and content provider.

E2. Receiving the indication of the identity of the media content and the content provider associated with the captured media content.

Figure 5C:
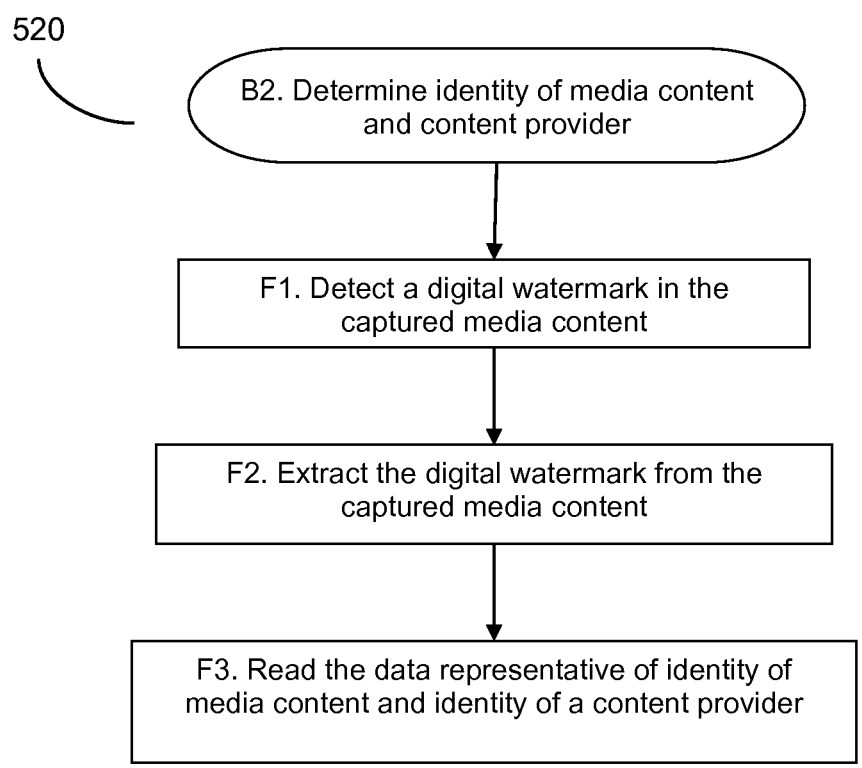
FIG. 5c is another flow diagram illustrating a further example process for determining the identity of the media content according to the invention.

FIG. 5c is a flow diagram illustrating an example process 520 that may be used by process 400, 500 or 510. The media content may include a digital watermark including data representative of the content provider and the identity of the media content. The captured media content includes data representative of the digital watermark, which is preserved when the media content is played back from the second media device. The process of determining the identity of the media content and content provider may be performed by the first media device, entity or by the analysis module based on the following steps:

F1. Detect a digital watermark in a portion of the captured media content.

F2. Extract the digital watermark from the portion of the captured media content.

F3. Read or interpret from the extracted digital watermark the data representative of the identity of the media content and identity of the content provider for use in downloading the media content from the content provider.

The digital watermark may include a timestamp for use in synchronising the playback of the downloaded identified media content from the first media device with that from the second media device.

Figure 6:
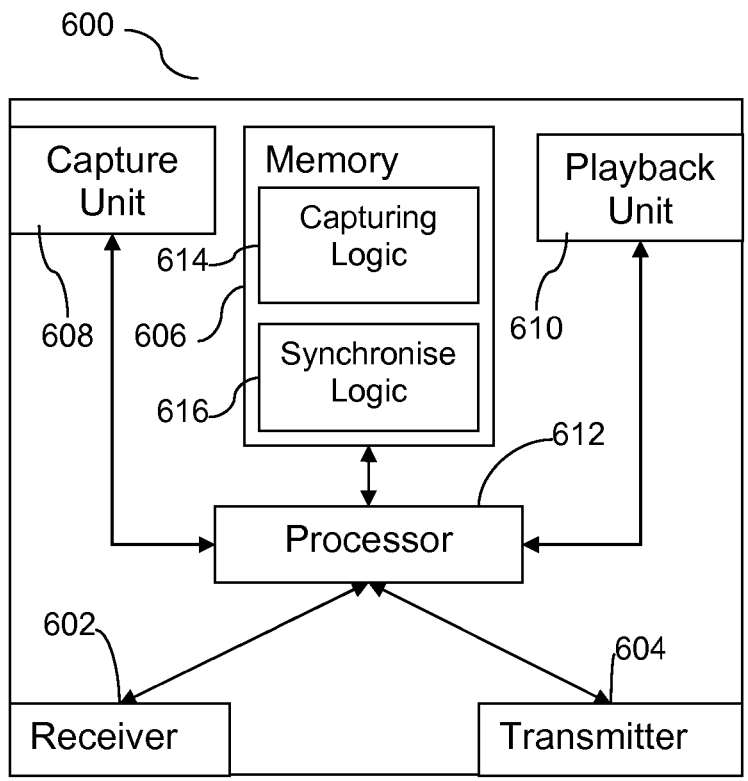
FIG. 6 is a schematic illustration of an example media device according to the invention.

FIG. 6 is a schematic illustration of an apparatus or media device 600 (e.g. first or second media device 102 or 104) playing back media content according to the invention. The apparatus 600 is implemented as a combination of computer hardware and software. The apparatus 600 includes a receiver 602, a transmitter 604, a memory or storage 606, a capture unit 608, a playback unit 610, and a processor or processing logic 612, the processor 612 being connected to the receiver 602, to the transmitter 604, to the memory 606, to the capture unit 608, and to the playback unit 610. The memory 606 stores the various programs/executable files that are implemented by the processor 612. The programs/executable files stored in the memory 606, and implemented by the processor 612, may include a capturing logic 614 (e.g. encoding algorithms for encoding captured media content) and synchronising logic 616. The receiver 602 and transmitter 604 may form a transceiver for communicating with other entities, service providers or M2M platforms, systems, apparatus, content providers over a communication network.

In operation, the processor 612 and capture unit 608 are caused by capture logic 614 to detect playback of the media content output from a second media device. The playback of the audio portion of the media content may be from a speaker of the second media device such that the detection of the media content is the detection of an analogue audio signal corresponding to audio portion. The capture logic 614 may include encoding algorithms for capturing the output media content or the analogue audio signal in a digital format (e.g. MP3 or AAC). The memory 606 is configured to store the captured media content in the digital format. The processor 612 is further configured to identify the media content and a content provider from the captured media content. The receiver 602 and transmitter 604 are configured to download the identified media content from the content provider. Once downloaded, the processor 612 and playback unit 610 are caused by synchronise logic to substantially synchronise or roughly synchronise playback of the downloaded media content from the media device with the playback of the media content output from the second media device. The playback unit 610 may be a speaker and/or a display, or alternatively, it may be audiovisual components or circuitry for use in coupling the apparatus 600 to a suitable display/speaker unit (e.g. a television).

In some examples of apparatus 600, the transmitter 604 and processor 612 may be further configured to send at least a portion of the captured media content to a service provider entity, system or M2M platform or distribution application for determining the identity of the media content and content provider. The receiver 602 is further configured to receive, in response from the service provider entity, system or M2M platform or distribution application, an indication of the identity of the media content and the content provider associated with the captured media content.

Although apparatus or media device 600 has been briefly described, it is to be appreciated by the person skilled in the art that the apparatus or media device 600 may be further configured to implement the relevant parts of the methods, procedures, or processes as described herein with reference to FIGS. 1a-5c.

Figure 7:
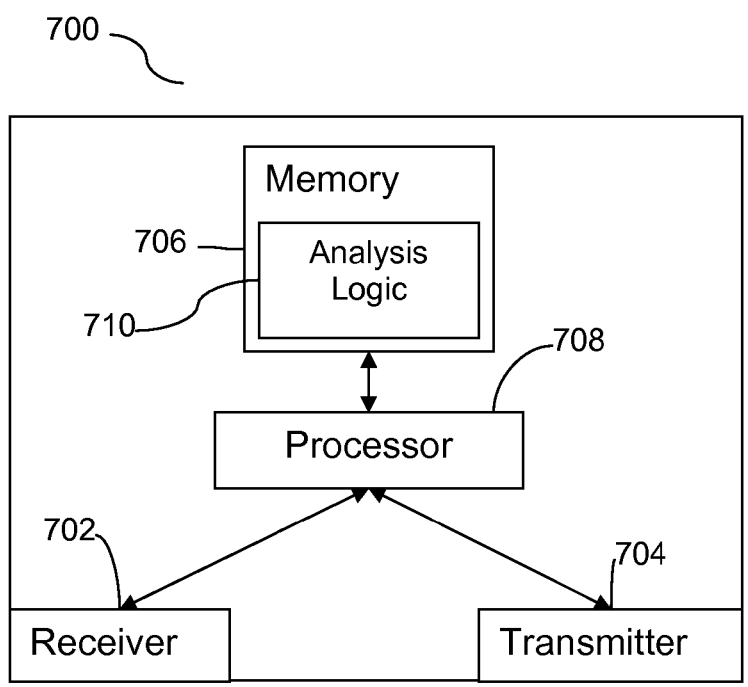
FIG. 7 is a schematic illustration of an example network entity (e.g. a mobile-to-mobile platform) according to the invention.

FIG. 7 is a schematic illustration of a network entity or service provider device 700 (e.g. service provider entity, system, or M2M platform or distribution application) for use in conjunction with apparatus or media device 600 when required to identify media content for playing back the identified media content according to the invention. The entity 700 is implemented as a combination of computer hardware and software. The entity 700 includes a receiver 702, a transmitter 704, a memory or storage 706, and a processor or processing logic 708, the processor 708 being connected to the receiver 702, to the transmitter 704, and to the memory 706. The memory 706 stores the various programs/executable files that are implemented by the processor 708. The programs/executable files stored in the memory 706, and implemented by the processor 708, may include various M2M applications such as an M2M media distribution application and, by way of example only, analysing logic 710. The receiver 702 and transmitter 704 may form a transceiver for communicating with other entities, media devices or apparatus 600, 102, 104, or content providers over a communication network.

In operation, the receiver 702 is configured to receive at least a portion of the captured media content from the media device 600. The processor 708 is caused by analysis logic 710 to determine the identity of the media content and content provider. The transmitter 704 is configured to transmit an indication of the identity of the media content and the content provider for use by the media device in playback of the identified media content.

In some examples, the analysis logic 710 may cause the processor 708 and transmitter 704 to send at least a received portion of the captured media content to an analysis module for determining the identity of the media content and content provider. The receiver 702 may be further configured to receive the indication of the identity of the media content and the content provider associated with the captured media content. Alternatively, in other example, the analysis logic 710 may cause the processor 708 to analyse the received portion of the captured media content for determining the identity of the media content and content provider. The at least a received portion of the captured media content may include data representative of a digital watermark indicating the identity of the media content and the content provider.

Although network entity or service provider device 700 has been briefly described, it is to be appreciated by the person skilled in the art that the network entity 700 may be further configured to implement the relevant parts of the methods, procedures, or processes as described herein with reference to FIGS. 1a-6.

The media device 600 and entity or service provider device 700 as herein described can include a memory or a memory unit 606 and 706, respectively, which can be used for storing one or more computer programs including computer readable code which, when executed by the processors or processing logic 612 and 708, respectively, causes the media device 600 and entity/service provider device 700 to perform the relevant methods, procedures, or processes of the invention as described herein, for example, with respect to FIGS. 1a-5c. Such computer programs as described herein can be incorporated within one or more computer program products, each comprising a non-transitory computer readable medium and one or more of the computer programs, where one or more of the computer programs are stored on the non-transitory computer readable medium. The non transitory computer readable medium may include computer program instructions stored thereon, which when executed on one or more processors of a media device, service provider device, M2M platform, or other computing system, performs the relevant processes or method steps for playback or identification of media content for playback on a first media device as described herein with reference to FIGS. 1a-7.

Alternatively or in addition to, hardwired circuitry may be used in place of or in combination with the computer program instructions to implement processes and methods consistent with the present invention. Examples of hardware circuitry may include, but are not limited to, semiconductor chips, integrated circuits, field programmable gate arrays, application-specific integrated circuits, electronically programmable integrated circuits and the like. Thus, the present invention is not limited to any specific combination of hardware circuitry and/or software.

Although the invention has been described in terms of preferred embodiments as set forth above, it should be understood that these embodiments are illustrative only and that the claims are not limited to those embodiments. Those skilled in the art will be able to make modifications and alternatives in view of the disclosure which are contemplated as falling within the scope of the appended claims. Each feature disclosed or illustrated in the present specification may be incorporated in the invention, whether alone or in any appropriate combination with any other feature disclosed or illustrated herein.

The invention claimed is:

1. A method for a media device to playback media content, the method comprising:
   detecting playback of the media content output from a second media device;
   capturing and storing the media content, wherein the captured media content comprises a plurality of frames of an audio signal corresponding to the audio signal of the media content;
   adjusting a frame counter for each captured frame when capturing the media content;
   identifying the media content and a content provider from the captured media content;
   downloading the identified media content from the content provider; and
   substantially synchronising a playback of the downloaded media content from the media device with the playback of the media content output from the second media device,
   substantially synchronising the playback comprising:
   determining a current number of captured frames based on the frame counter, and
   starting playback of the downloaded media content based on the current number of captured frames.

2. The method as claimed in claim 1, wherein identifying the captured media content and the content provider further comprises:
   sending at least a portion of the captured media content to a machine-to-machine, M2M, platform provider for determining the identity of the media content and content provider; and
   receiving, in response from the M2M platform, an indication of the identity of the media content and the content provider associated with the captured media content.

3. The method as claimed in claim 1, wherein the media content includes a digital watermark for identifying the content provider and the media content, and the captured media content includes data representative of the digital watermark.

4. The method as claimed in claim 3, wherein the digital watermark is embedded within the media content at a plurality of locations in the media content.

5. The method as claimed in claim 4, wherein the digital watermark further includes a timestamp signal, and substantially synchronising the playback further comprises starting playback of the downloaded media content from an audio signal frame of the downloaded media content based on the timestamp signal.

6. The method as claimed in claim 5, wherein substantially synchronising the playback further comprises cross-correlating at least one of the audio signal frames of the captured media content with the plurality of audio signal frames of the downloaded media content to determine the most likely starting point for playback of the downloaded media content.

7. The method as claimed in claim 1, wherein the downloaded media content comprising a plurality of frames of an audio signal corresponding to the audio signal of the identified media content, and substantially synchronising the playback further comprising:
   determining a most recently captured audio signal frame of the captured media content by reading the current number of captured frames, and
   starting playback of the downloaded media content from an audio signal frame of the downloaded media content based on the most recently captured audio signal frame of the captured media content.

8. The method as claimed in claim 1, wherein:
   detecting playback of the media content output from a second media device further comprises detecting playback of the media content output in an analogue format from the second media device; and
   capturing and storing the media content further comprises capturing and storing the media content in a digital format.

9. The method as claimed in claim 1, wherein the media content is audio media content.

10. The method as claimed in claim 1, wherein the media content is audiovisual media content.

11. A method for identifying captured media content for playback on a media device based on playback of media content output from a second media device, the method comprising:
  receiving a message from the media device, wherein the message comprises: (i) at least a portion of the captured media content from the media device and (ii) identity information of the media device;
  determining an identity of the captured media content and a content provider; and
  transmitting a response to the media device, wherein the response comprises: (i) an indication of the identity of the captured media content and the content provider and (ii) authentication information indicating whether the media device is authorized to download the identified media content from the content provider.

12. The method as claimed in claim 11, wherein determining the identity of the captured media content and the content provider further comprises:
  sending at least a portion of the captured media content to an analysis module for determining the identity of the media content and the content provider; and
  receiving the indication of the identity of the media content and the content provider associated with the captured media content.

13. The method as claimed in claim 11, wherein the media content includes a digital watermark comprising data representative of the content provider and the identity of the media content, and the captured media content includes data representative of the digital watermark, wherein:
  determining the identity of the media content and the content provider further comprises detecting, extracting and reading the digital watermark in the captured media content.

14. The method as claimed in claim 11, wherein the method is performed by a mobile-to-mobile platform.

15. The method as claimed in claim 11, wherein the media content is audio media content.

16. The method as claimed in claim 11, wherein the media content is audiovisual media content.

17. A media device comprising:
  a receiver;
  a transmitter;
  a memory; and
  a processor coupled to the memory, wherein the processor is configured to:
  detect playback a media content output from a second media device,
  capture the output media content,
  store the captured media content in the memory, wherein the captured media content comprises a plurality of frames of an audio signal corresponding to the audio signal of the output media content,
  adjust a frame counter for each captured frame when capturing the media content,
  identify the media content and a content provider from the captured media content,
  employ the receiver and the transmitter to download the identified media content from the content provider, and
  substantially synchronise a playback of the downloaded media content from the media device with the playback of the media content output from the second media device, wherein substantially synchronising the playback comprises:
    determine a current number of captured frames based on the frame counter, and
    start playback of the downloaded media content based on the current number of captured frames.

18. The media device as claimed in claim 17, the processor further configured to:
  employ the transmitter to send at least a portion of the captured media content to a machine-to-machine, M2M, platform provider for determining the identity of the media content and content provider; and
  employ the receiver to receive, in response from the M2M platform, an indication of the identity of the media content and the content provider associated with the captured media content.

19. A service platform for identifying captured media content for playback on a media device, the service platform comprising:
  a receiver;
  a transmitter;
  a memory;
  a processor coupled to the memory, wherein the processor is configured to:
  employ the receiver to receive a message from the media device, wherein the message comprises: (i) at least a portion of the captured media content from the media device and (ii) identity information of the media device,
  determine an identity of the captured media content and a content provider, and
  employ the transmitter to transmit a response to the media device, wherein the response comprises: (i) an indication of the identity of the captured media content and the content provider and (ii) authentication information indicating whether the media device is authorized to download the identified media content from the content provider.

20. The service platform as claimed in claim 19, the processor further configured to:
  employ the transmitter to send at least a portion of the captured media content to an analysis module for determining the identity of the captured media content and the content provider, and
  employ the receiver to receive the indication of the identity of the media content and the content provider associated with the captured media content.

* * * * *